United States Patent [19]

F'Geppert

[11] Patent Number: 4,909,775
[45] Date of Patent: Mar. 20, 1990

[54] DEVICE FOR TRANSFERRING ROTARY MOTION BETWEEN TWO SHAFTS

[75] Inventor: Erwin F'Geppert, Novi, Mich.

[73] Assignee: The United States of America as represented by the Secretary of the Army, Washington, D.C.

[21] Appl. No.: 296,567

[22] Filed: Jan. 13, 1989

[51] Int. Cl.⁴ .............................................. F16D 3/26
[52] U.S. Cl. ..................................... 464/147; 464/106
[58] Field of Search ............... 464/106, 112, 113, 114, 464/115, 123, 124, 137, 138, 147, 149, 157, 904

[56] References Cited

U.S. PATENT DOCUMENTS

| | | | |
|---|---|---|---|
| 659,827 | 10/1900 | Putnam | 464/106 |
| 901,080 | 10/1908 | Dock | 464/138 |
| 981,736 | 1/1911 | Zock | 464/138 |
| 1,863,244 | 6/1932 | Goddard | 464/124 |
| 3,942,335 | 3/1976 | Orain | 464/124 X |
| 4,810,232 | 3/1989 | Farrell et al. | 464/123 X |

FOREIGN PATENT DOCUMENTS

| | | | |
|---|---|---|---|
| 2548298 | 1/1985 | France | 464/106 |
| 248920 | 11/1986 | Japan | 464/137 |

Primary Examiner—Daniel P. Stodola
Attorney, Agent, or Firm—Peter A. Taucher; Gail S. Soderling

[57] ABSTRACT

The invention is a universal joint for transferring rotary motion between two shafts whose axes are movable relative to one another. The universal joint includes a generally Y-shaped terminus on either shaft, and a pair of arms on each terminus diverging obliquely away from the axes of the respective shafts. A frame member connected between the termini has a plurality of rods radiating therefrom to engage the arms of the termini. A bearing swivellingly mounted in each arm of the termini defines a through bore for accommodating translational movement of the rods through the bearings.

11 Claims, 4 Drawing Sheets

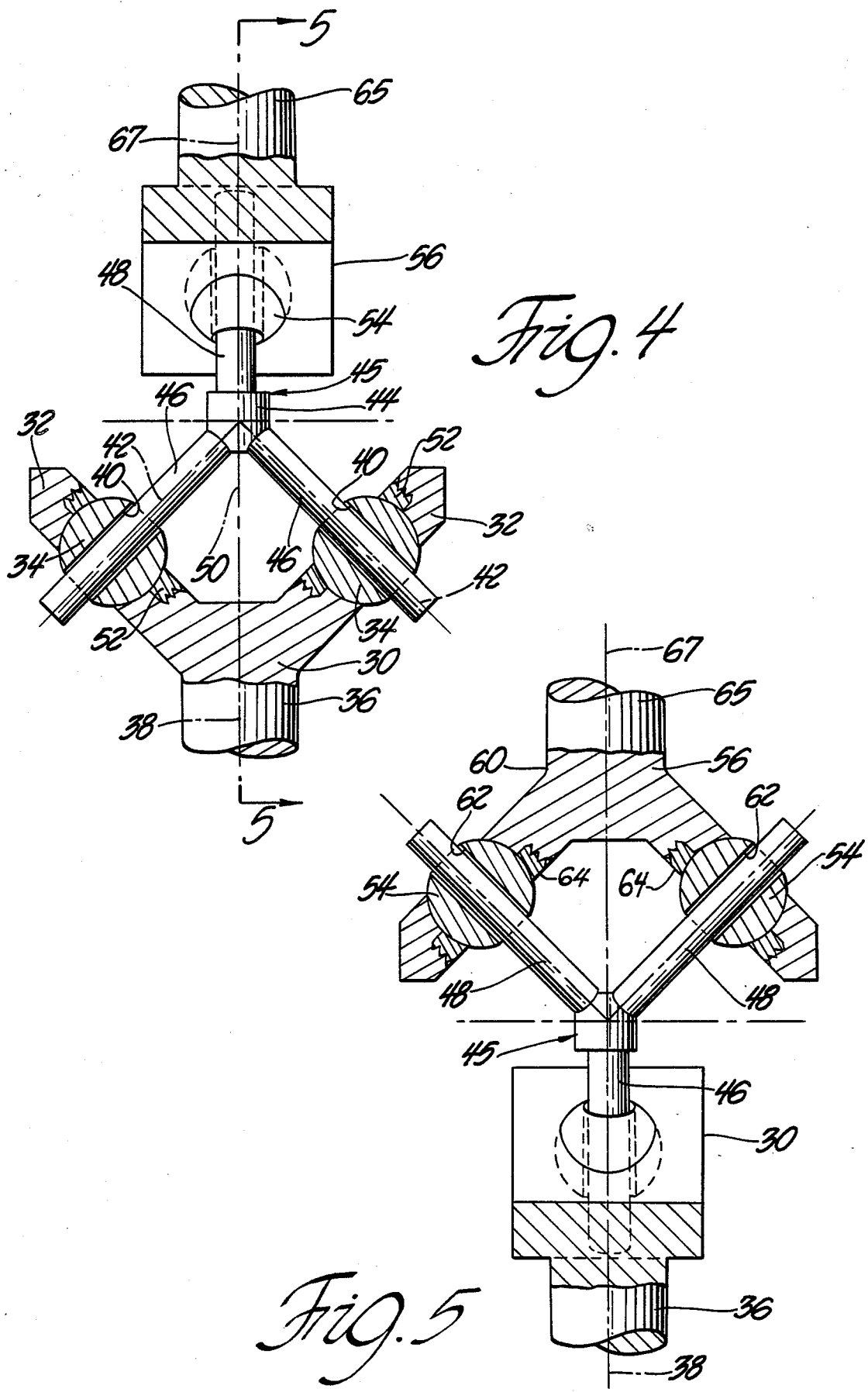

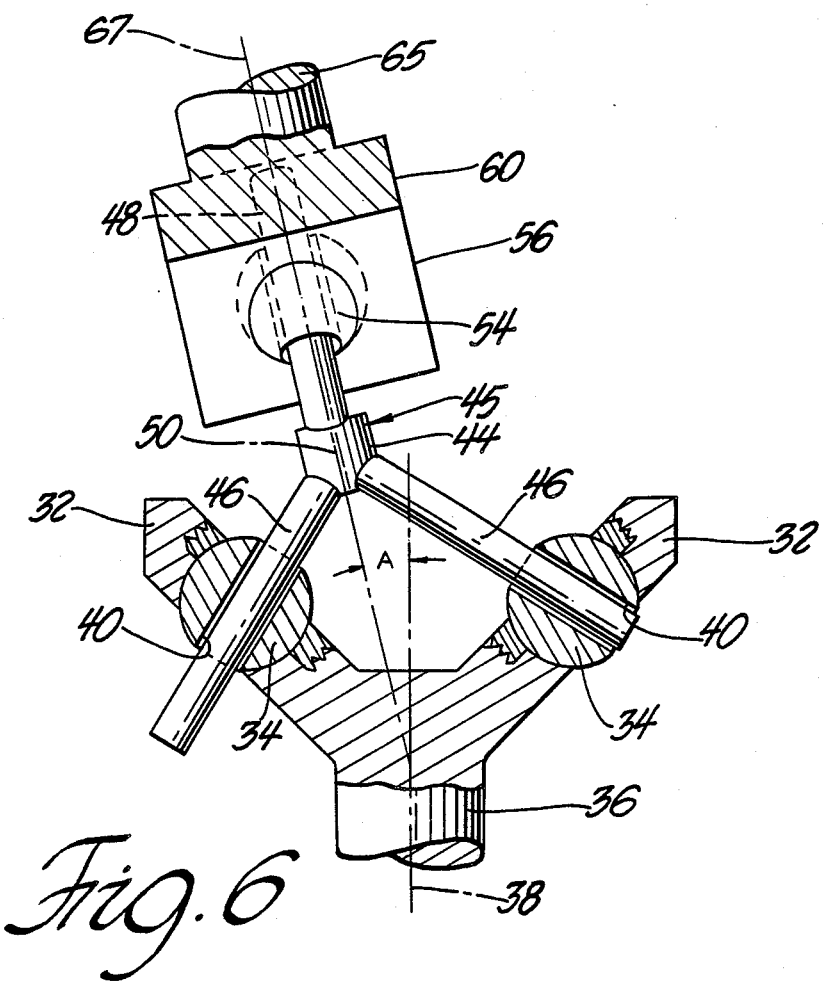
Fig. 6
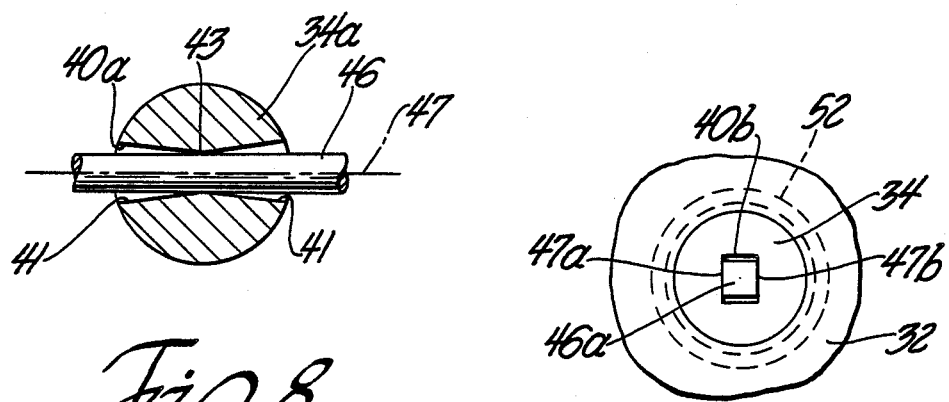
Fig. 8
Fig. 9

DEVICE FOR TRANSFERRING ROTARY MOTION BETWEEN TWO SHAFTS

GOVERNMENT INTEREST

The invention described herein may be manufactured, used, and licensed by or for the Government for governmental purposes without payment to me of any royalty thereon.

BACKGROUND AND SUMMARY

The invention herein relates to universal joints for transferring rotational motion between two shafts whose longitudinal axes are shiftable relative to each other.

A typical conventional universal joint between shafts is comprised of a U-shaped yoke attached to each shaft, one of the yokes being axially slideable on one of the shafts. Each of the yokes is pivotable about one of two perpendicularly intersected axes of a connector body which is engaged between the yokes. Such a universal joint permits relative movement of the shafts only within the common plane defined by their longitudinal axes. The longitudinal axes of the shafts must swing about a point in this plane where extensions of these longitudinal axes intersect. In order for the shaft axes to move relative to each other in separate planes, two conventional universal joints are necessary, one mounted at either end of a transfer shaft disposed between a driving shaft and a driven shaft.

My invention is a universal joint which permits simultaneous multiplane relative movement between two connected rotating shafts. My invention permits such movement without a second universal joint or a transfer shaft so that weight, space and manufacturing economies are achieved. Further, the rotational inertia in a drive train incorporating my universal joint is reduced. My universal joint is useful, for example for all-terrain vehicles, where it is desired to have maximum freedom of movement between the engine and the driven wheels with minimum vehicle space and weight dedicated to the drive train.

My universal joint includes a terminus on a driving shaft and on a driven shaft, the termini having arms diverging away from the axes of the shafts to which the termini are attached. Between the termini is a frame member having rods radiating therefrom into engagement with the arms of the termini. Mounted in the arms are swivel bearings defining bores to accommodate translation of the rods therethrough, whereby the frame member can tilt with respect to the termini without escaping therefrom.

BRIEF DESCRIPTION OF THE DRAWINGS

FIG. 4 is a sectional view of the first embodiment of my universal joint.

FIG. 5 is a view taken along line 5—5 in FIG. 4.

FIG. 6 is a view of the universal joint after it has moved from its FIG. 4 position.

FIG. 8 shows an alternate embodiment of a bearing for my universal joint.

FIG. 9 shows a modified rod and bearing for my universal joint, the line of sight for FIG. 9 being along the longitudinal axis of the rod.

DETAILED DESCRIPTION

Figure 1:
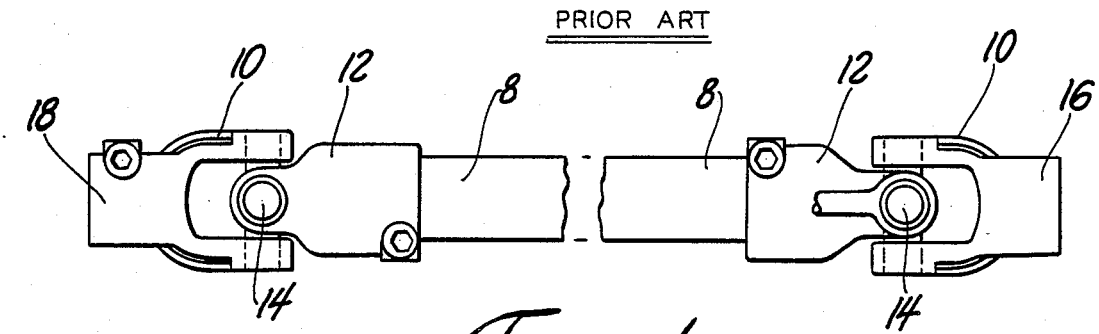
FIGS. 1 through 3 are illustrations of prior art universal joints.
Figure 2:
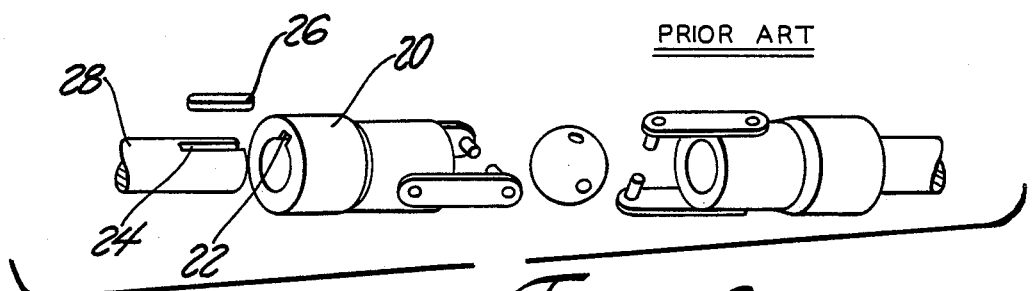
Figure 3:
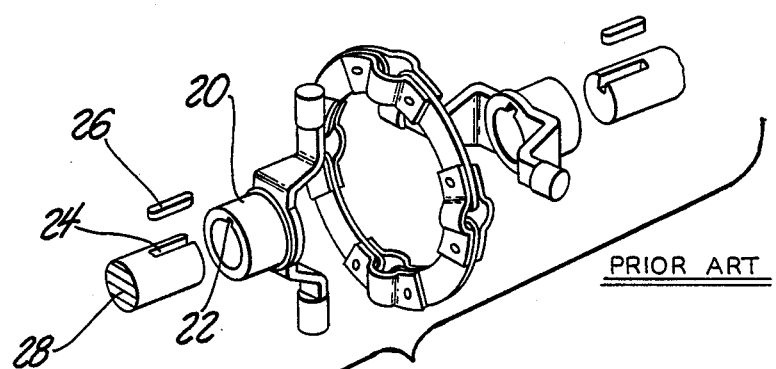

FIGS. 1 through 3 illustrate known typical constructions for universal joints. FIG. 1 shows a drive train shaft 8 connected between two universal joint assemblies, each of which includes a pair of identical yokes 10, 12 and a connective member 14 to which the yokes are pivotally attached. Connective member 14 has first pins disposed along a first axis passing through the arms of yoke 10 such that yoke 10 pivots about the first axis. Connective member 14 has second pins disposed along a second axis perpendicularly intersecting the first axis, the second pins passing through the arms of yoke 12. One of the universal joint assemblies is connected to a power input shaft 18 and the other universal joint assembly is connected to an output shaft 16. For the construction shown in FIG. 1, the rotational axes of shafts 18 and 8 (or any two similarly connected shafts) must lie in the same plane. The angles which these axes form with the shaft 8 axis must be equal to keep shaft 16 from angularly accelerating and decelerating relative to shaft 18 as shaft 18 rotates.

FIGS. 2 and 3 are exploded views of other known constructions for universal joints, both figures showing a cylindrical collar 20 fixed to the universal joint. The figures are largely self explanatory, but it is noted that there is axial sliding movement between collar 20 and a power transmission shaft 28. However, relative rotation between collar 20 and shaft 28 is prevented by key 26 which fits into slots 22 in the collar and slot 24 in the shaft.

FIG. 4 shows the construction of the universal joint I propose, which includes a generally Y-shaped terminus 30 fixed to the end of drive shaft 36. Terminus 30 has plate-like arms 32 diverging from rotational axis 38 of drive shaft 36, the angle of divergence typically being 45 degrees. Defined in arms 32 are semi-spherical pockets radially symmetric with respect to an axis 42 perpendicular to the general plane of the arms. The pockets swivellingly accommodate spherical bearings 34 protruding from opposing planar surfaces of arms 32. Extending diametrically through spherical bearings 34 are cylindrical passages 40, the central axis of cylindrical passages 40 normally being aligned with axes 42. Bearings 34 are retained on arms 32 by rings 52 whose inner diametrical surfaces define a portion of the semi-spherical pockets. The outer diametrical surfaces of the rings 52 are threaded so that the rings can be screwed into arms 32. Preferably, no part of ring 52 extends beyond the general plane of arm 32.

Passing through cylindrical passages 40 are a first pair of rods 46, which extend from a central body 44 of spider frame 45. Rods 46 have a slightly smaller diameter than passages 40, so that spider frame 45 can move relative to terminus 30. Rods 46 are angularly equidistant from axis 50, which is an extension of the central axis of body 44. Rods 46 form an angle with each other equal to the angle between arms 32, this angle preferably being approximately 90 degrees. The longitudinal axes of rods 46 and axis 50 all lie in a first common plane bisecting central body 44. The longitudinal axes of rods 46 extend away from a common point.

A second pair of rods extends from central body 44, as shown at 48 in FIGS. 4 and 5. The longitudinal axes of the second pair of rods and axis 50 all lie in a second common plane bisecting central body 44. The first and second common planes are perpendicular to each other. Rods 48 in the second pair are angularly equidistant from axis 50 and form an angle between themselves of approximately 90 degrees. The longitudinal axes of rods 48 extend away from a common point.

Referring again to FIGS. 4 and 5, rods 48 are slideable through spherical bearings 54 swivelable in plate-like arms 56. Arms 58 are integral parts of terminus 60, which is coaxially fixed to driven shaft 65. Spherical bearings 54 define cylindrical passages 62 therethrough to accommodate the sliding motion of rods 48, the diameter of passages 62 being greater than the diameter of rods 48, so that spider frame 45 can move relative to the terminus 60. To retain bearings 54 in arms 56 are rings 64, which are identical to corresponding rings 52 on terminus 30.

FIG. 6 shows my universal joint as it has reacted to a counter-clockwise pivotal movement of driven shaft 65 from its FIG. 4 position. This pivotal movement is in a plane defined by the axes of arms 46. The respective axes 38 and 67 of shafts 36 and 65 are no longer aligned but form an angle "A" herebetween. Spider frame 45 has tilted leftward from its FIG. 4 position, rods 46 have translated through bearings 34 to accommodate the movement of the spider frame, and bearings 34 have swivelled to accommodate angular movement of the rods. As shafts 36 and 65 rotate, generally cylindrical central body 44 rotates about its own axis, rods 46 reciprocally translate through bearings 34 and bearings 34 pivot back and forth through an angle twice the size of angle "A" in FIG. 6.

It can be seen from FIGS. 4, 5 and 6 that arms 32 or 56 define facial openings where bearings 34 or 54 protrude through the surfaces of the arms. For any given arm 32 or 56, there is a pair of such openings, one opening of the pair being on the opposite side of the arm from the other opening of the pair. If the axis 67 of the driven shaft 65 moves counterclockwise from its FIG. 4 position to its FIG. 6 position so as to form angle "A" with axis 38 of drive shaft 36, then leftward rod 46 approaches the edge of the lower facial opening in left arm 32. If driven shaft 65 continues further counterclockwise from its FIG. 6 position, then left rod 46 will strike the edge of the lower facial opening, so that rod 46 is prevented from further counterclockwise motion. Also, the bearing 34 associated with left rod 46 is prevented from swivelling further counterclockwise.

My universal joint can also react to pivotal movement of shaft 65 in the plane defined by the longitudinal axes of rods 48. Assume, for example, that the lower end of drive shaft 65 tilts backward, away from the viewer in FIG. 6 and axes 38 and 67 nonintersectingly lie in different planes. The lower end of spider frame 45 will tilt away from the viewer, rods 48 will translate in bearings 54 to accommodate the movement of central body 44, and bearings 54 will swivel to accommodate the movement of rods 48. My universal joint can simultaneously react to both the aforementioned leftward tilt and to the backward tilt of the lower end of driven shaft 65.

Figure 7:
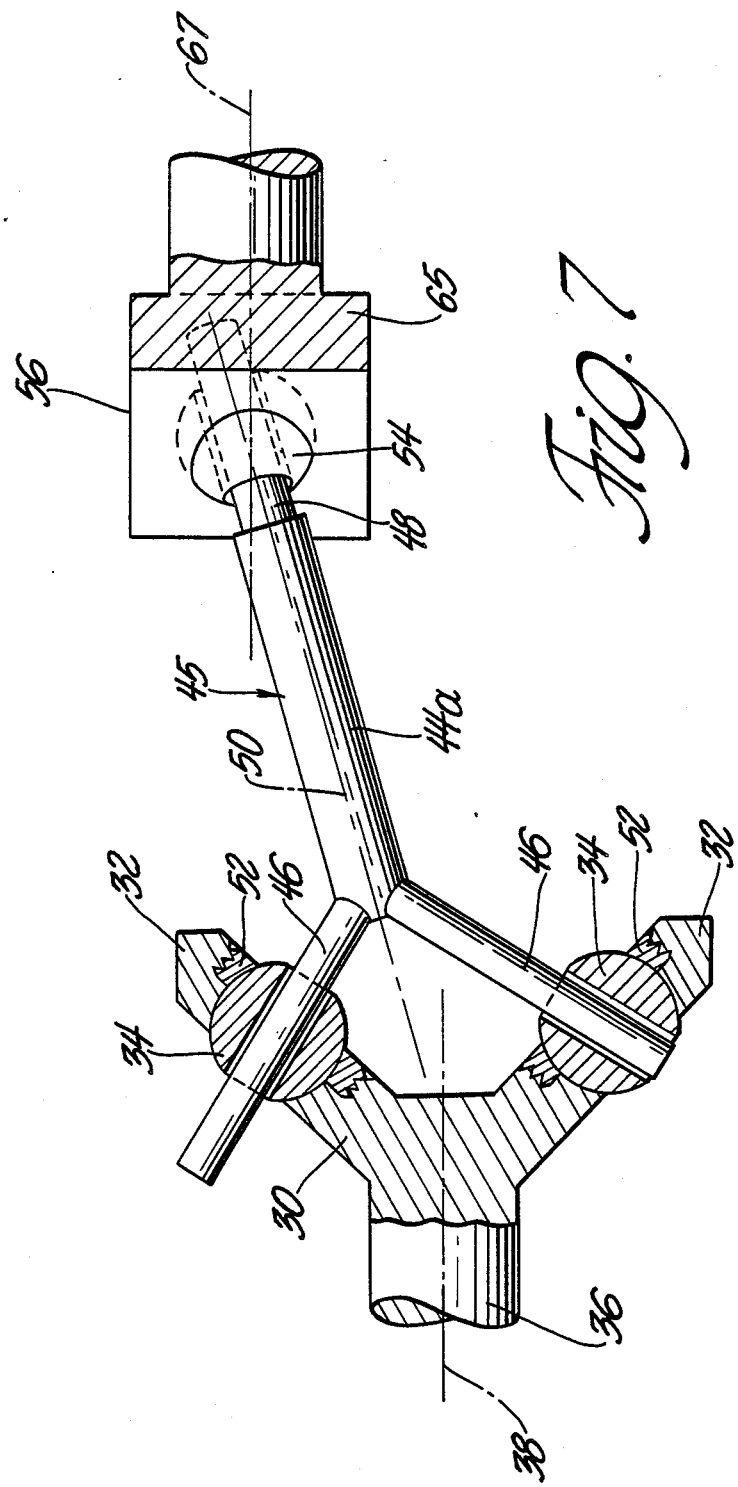
FIG. 7 is a sectional view of an alternate embodiment of my universal joint.

FIG. 7 illustrates an alternate embodiment of my universal joint, which is identical to the previous embodiment, except that the central body 44a is longer than the central body 44 of the previous embodiment. Drive shaft 36 and driven shaft 65 are parallel to one another but are not axially aligned, these shafts forming equal angles with central body 44a of spider frame 45.

FIG. 7 shows that my universal joint can be adapted to replace the conventional dual joint assembly shown in FIG. 1.

FIG. 8 shows a modified spherical bearing 34a which can replace bearings 34 or bearings 54 in the universal joint. Bearing 34a defines a through passage 40a having open ends 41 which have a larger diameter than the central zone 43 of the passage, the diameter of the central zone being equal to the diameter of rod 46. Passage 40a tapers from the openings 41 to the central zone 43 so as to form two frustroconically shaped portions of the passage, the portions having an equal angle of taper. The shape of passage 40a allows rod 46 to tilt with respect to center axis 47 of the passage.

FIG. 9 shows a modification to my universal joint assembly wherein the rods, as at 46a, are rectangular in cross-section and the bores 40b in bearings 34 are also rectangular in cross-section. Preferably, two opposing sides 47a and 47b of rod 46a fit slidingly closely against complimentary opposing sides of bore 40b. Aside from the detail shown in FIG. 9, the modified universal joint will be the same as that shown in FIGS. 4 through 6 or that shown in FIG. 8. Rods 46a will be disposed similarly to rods 46 in FIG. 4 or FIG. 7 and opposing rod sides 47a and 47b will lie in planes parallel to the plane defined by the longitudinal axes of rods 46a. The modification illustrated by FIG. 9 permits frame 45 to tilt with respect to the termini 30 and 60 and permits rods 46a to translate through the bearing while eliminating rotational slack between rod 46a and bearing 40a, the rotational slack eliminated being the relative angular movement between arms 46a and bore 40b about the rotational axis 50 of frame 45, which can be seen in FIGS. 6 and 7.

I wish it to be understood that I do not desire to be limited to the exact details of construction shown and described, since obvious modifications may occur to those skilled in the relevant without departing from the scope and spirit of the following claims.

I claim:

1. A universal joint assembly for transferring rotary motion between two shafts whose rotational axes are moveable relative to one another, comprising:
    a drive terminus rotatable by a power input shaft and fixed against translation along the rotational axis of the input shaft;
    a driven terminus for rotating a power receiving shaft and fixed against translation along the rotational axis of the receiving shaft;
    a pair of arms on each terminus, the arms of each pair diverging obliquely away from the rotational axis of the respective shaft;
    a cavity defined by each arm, the cavity being open on opposing sides of each arm and having spherically curved inner peripheral walls;
    a bearing swivelable in each cavity, the bearing defining a bore therethrough;
    a frame member disposed between the termini having frame rods radiating therefrom, the frame rods slidably received in the bores in the bearings.

2. The assembly of claim 1 wherein two frame rods lie in one plane and two additional frame rods lie in another plane perpendicular to the one plane.

3. The assembly of claim 2 wherein no three of the rods lie in a common plane.

4. The assembly of claim 2 wherein the rods in the one plane engage bearings associated with the drive shaft and rods in the other plane engage bearings associated with the driven shaft.

5. The assembly of claim 4 wherein the bearings associated with the drive shaft have a limited range of rotation with respect to an axis perpendicular to the one plane.

6. The assembly of claim 5 wherein the bearings associated with the driven shaft have a limited range of rotation with respect to an axis perpendicular to the other plane.

7. The assembly of claim 4 wherein the arms of a selected one of the termini define openings to the cavities on opposite sides of the arm, the sides of the openings limiting the motion of the rods associated with the selected one of the termini, the sides of the openings thereby limiting the swivelling motion of the bearings associated with the selected one of the termini.

8. The assembly of claim 4 wherein the longitudinal axes of the rods meet at a common point.

9. The assembly of claim 1 wherein the rods of the frame member have a rectangular cross-section and the bores in the bearings have a rectangular cross-section, two opposite sides of the rods faced against two opposed sides of the respective bores, at least one of the remaining sides of the rods defining a gap with a remaining side of the bore, the opposite sides of the rods and the opposed sides of the bores lying parallel to the plane defined by the longitudinal axes of the rods, thereby allowing the frame member to tilt relative to the termini while eliminating slack therebetween in an angular direction about the rotational axes of the termini.

10. The assembly of claim 1 further comprising a plug ring in each arm for retaining the bearing in the arm, the inner diameter of the ring defining a curved surface conforming to the bearing and the outer diameter of the ring threaded for engagement with a threaded bore in the arm.

11. A universal joint assembly for transferring rotary motion between two shafts whose rotational axes are moveable simultaneously in three dimensions relative to one another, comprising:
    a drive terminus fixed coaxially to a power input shaft;
    a driven terminus fixed coaxially to a power transfer shaft;
    a pair of plate-like arms on each terminus, the arms of each pair diverging obliquely away from the rotational axis of the respective shaft;
    a cavity defined by each arm, the cavity being open on opposing sides of each arm and having spherically curved inner peripheral walls;
    a bearing swivelable in each of the cavities and protruding through the open sides of the cavity, the bearing defining a cylindrical bore therethrough, the openings of the bore being disposed in the portions of the bearing protruding through the open sides of the cavity;
    a frame member disposed between the termini having straight cylindrical frame rods radiating therefrom for translation through the bores in the bearings, the diameter of the rods being smaller than the diameter of the cylindrical bores.

* * * * *